(12) United States Patent
Yagisawa et al.

(10) Patent No.: US 10,627,981 B2
(45) Date of Patent: Apr. 21, 2020

(54) OPERATION APPARATUS

(71) Applicant: Mitsubishi Electric Corporation, Tokyo (JP)

(72) Inventors: Takaki Yagisawa, Tokyo (JP); Daisuke Iizawa, Tokyo (JP); Ryo Yoshida, Tokyo (JP); Kenshiro Kitamura, Tokyo (JP); Chiyo Yoshimura, Tokyo (JP); Saika Tashiro, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/300,443

(22) PCT Filed: Jun. 10, 2016

(86) PCT No.: PCT/JP2016/067378
§ 371 (c)(1),
(2) Date: Nov. 9, 2018

(87) PCT Pub. No.: WO2017/212642
PCT Pub. Date: Dec. 14, 2017

(65) Prior Publication Data
US 2019/0227674 A1     Jul. 25, 2019

(51) Int. Cl.
*G09G 5/00*     (2006.01)
*G06F 3/0481*     (2013.01)
(Continued)

(52) U.S. Cl.
CPC .......... *G06F 3/0481* (2013.01); *G06F 1/1632* (2013.01); *G08C 17/00* (2013.01);
(Continued)

(58) Field of Classification Search
CPC .................. G06F 1/1632; G06F 3/0481; G06F 3/03–0395; G06F 2200/1614;
(Continued)

(56) References Cited

U.S. PATENT DOCUMENTS

| 7,574,693 | B1* | 8/2009 | Kemink | ................... G06F 8/65 |
| | | | | 717/121 |
| 2008/0297372 | A1 | 12/2008 | Wouters | |
| 2009/0034209 | A1* | 2/2009 | Joo | ................... H04M 1/72575 |
| | | | | 361/729 |
| 2010/0009760 | A1* | 1/2010 | Shimamura | ........... A63F 13/428 |
| | | | | 463/43 |

(Continued)

FOREIGN PATENT DOCUMENTS

| JP | H09-130879 A | 5/1997 |
| JP | 2003-536305 A | 12/2003 |

(Continued)

OTHER PUBLICATIONS

Extended European Search Report issued in corresponding European Application No. 16904676.0 dated May 17, 2019.
(Continued)

*Primary Examiner* — Amr A Awad
*Assistant Examiner* — Aaron Midkiff
(74) *Attorney, Agent, or Firm* — Birch, Stewart, Kolasch & Birch, LLP

(57) ABSTRACT

A sensor detects whether or not an input device and a display device are in a combined state. A control mode determining unit determines a control mode associated with the state detected by the sensor. A control processing unit switches a control mode of a control target apparatus to the control mode determined by the control mode determining unit, and causes the display device to display a function to be operated in a display mode corresponding to the switched control mode.

3 Claims, 6 Drawing Sheets

(51) Int. Cl.
*H04N 5/00* (2011.01)
*G08C 23/04* (2006.01)
*H01H 9/02* (2006.01)
*G06F 1/16* (2006.01)
*G08C 17/00* (2006.01)
*G08C 17/02* (2006.01)
*H04Q 9/00* (2006.01)

(52) U.S. Cl.
CPC ............ *G08C 17/02* (2013.01); *G08C 23/04* (2013.01); *H01H 9/0235* (2013.01); *H04N 5/00* (2013.01); *H04Q 9/00* (2013.01); *G06F 2200/1614* (2013.01); *G06F 2200/1637* (2013.01); *G08C 2201/34* (2013.01); *H01H 2009/0257* (2013.01)

(58) Field of Classification Search
CPC ............... H04Q 9/00; G08C 17/00–06; G08C 23/00–06; G08C 2201/00–94; H01H 9/0235; H01H 2009/0257; H04N 5/00
USPC .................................................. 345/156–158
See application file for complete search history.

(56) References Cited

U.S. PATENT DOCUMENTS

2011/0291820 A1* 12/2011 Krahenbuhl .......... G06F 1/1626
　　　　　　　　　　　　　　　　　　　340/407.2
2012/0246374 A1* 9/2012 Fino ..................... G06F 1/1632
　　　　　　　　　　　　　　　　　　　710/303

FOREIGN PATENT DOCUMENTS

| JP | 2005-009831 A | 1/2005 |
| JP | 2009-517949 A | 4/2009 |
| JP | 2010-246030 A | 10/2010 |
| JP | 2014-154074 A | 8/2014 |
| WO | WO 01/95283 A2 | 12/2001 |
| WO | WO 2011/149604 A1 | 12/2011 |

OTHER PUBLICATIONS

International Search Report for PCT/JP2016/067378 (PCT/ISA/210) dated Jul. 19, 2016.

\* cited by examiner

OPERATION APPARATUS

TECHNICAL FIELD

The present invention relates to an operation apparatus for operating a function of a control target apparatus.

BACKGROUND ART

It has been widely practiced conventionally to display an operation button for operating a control target apparatus on a display unit of a remote controller and to operate the operation button displayed on the display unit to execute a function set for this operation button.

On the other hand, the number of operation buttons allocated to functions tends to increase due to recent multi-functionalization of a control target apparatus. Therefore, if all the operation buttons allocated to the functions of the control target apparatus are displayed on the display unit, it is difficult to specify an operation button corresponding to a target function, and thus operability is deteriorated.

In this regard, for example, in an operation panel described in Patent Literature 1, by operating a mode switching button, a control mode of a control target apparatus is switched to a simple mode or a normal mode, and display contents of a display unit are also switched.

Note that the simple mode is a control mode in which only basic functions of the control target apparatus can be used, and only operation buttons allocated to the basic functions are displayed on the display unit. Further, the normal mode is a control mode in which additional functions can be also used in addition to the basic functions, and operation buttons allocated to the additional functions are also displayed on the display unit.

CITATION LIST

Patent Literature

Patent Literature 1: JP 2005-9831 A

SUMMARY OF INVENTION

Technical Problem

In the operation panel described in Patent Literature 1, it is necessary to fixedly place the mode switching button on an operation surface. As a result, there is a problem that the operation surface is larger in order to ensure an area for placing the mode switching button, or a screen size for displaying the operation buttons is reduced by the area occupied by the mode switching button.

The present invention has been made to solve the above-mentioned problem, and it is an object of the present invention to provide an operation apparatus capable of switching a control mode of a control target apparatus and a display mode of a function thereof without separately providing a switching button.

Solution to Problem

An operation apparatus according to the present invention includes a detector, a determiner, and a control processor.

The detector detects whether an input device and a display device are in a combined state or in a detached state. The determiner determines a control mode associated with a state detected by the detector from among control modes that can be set for a control target apparatus, the state being one of the combined state and the detached state. The control processor switches a control mode of the control target apparatus to the control mode determined by the determiner and causes the display device to display a function to be operated in a display mode corresponding to the switched control mode.

The detector detects a positional relationship between the input device and the display device in the combined state, and the control processor causes the display device to display the function to be operated in the control mode determined by the determiner in a display mode associated with the positional relationship detected by the detector, and accepts an operation of the function by an operation method associated with the display mode.

Advantageous Effects of Invention

According to the present invention, the control mode and the display mode of the function to be operated are switched depending on whether or not the input device and the display device are the combined state. Thereby, it is possible to switch the control mode of the control target apparatus and the display mode of the function without separately providing a switching button.

DESCRIPTION OF EMBODIMENTS

Hereinafter, in order to explain the present invention in more detail, embodiments for carrying out the present invention will be described with reference to the accompanying drawings.

First Embodiment

Figure 1:
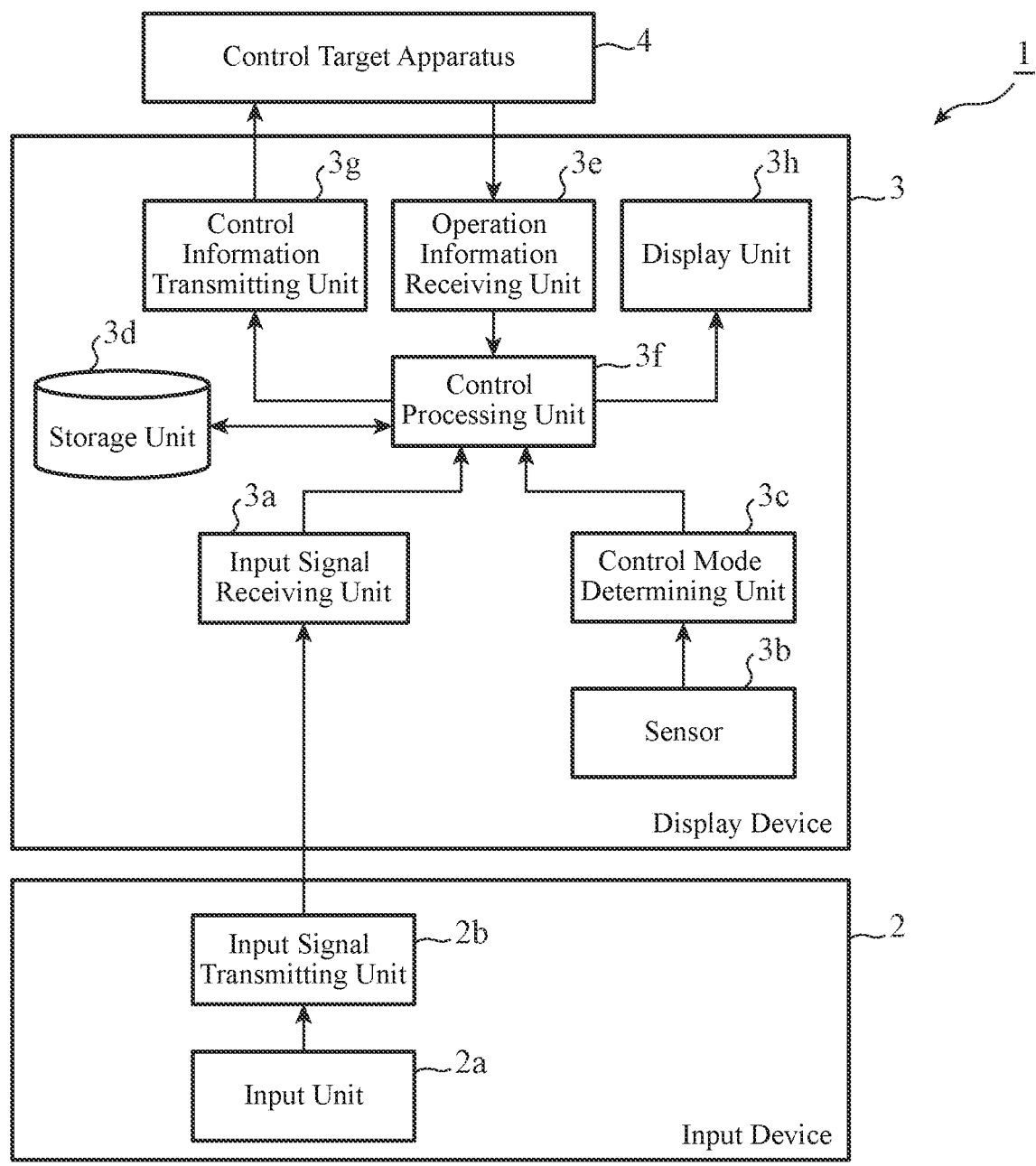
FIG. 1 is a block diagram showing a configuration of an operation apparatus according to a first embodiment of the present invention.

FIG. 1 is a block diagram showing a configuration of an operation apparatus 1 according to a first embodiment of the present invention.

The operation apparatus 1 is embodied by a remote controller that remotely controls an air conditioner and the like, and includes an input device 2 and a display device 3. The input device 2 can be combined with a part of the display device 3, and accepts a user operation and transmits an input signal to the display device 3. The input device 2 includes, as its configuration, an input unit 2a and an input signal transmitting unit 2b.

The input unit 2a accepts the user operation. For example, the input unit 2a has a hardware button and a switch disposed inside the input device 2, and outputs, to the input signal transmitting unit 2b, an input signal generated when the switch is pushed down by the hardware button.

The input signal transmitting unit 2b transmits the input signal from the input unit 2a to the display device 3. As a communication method between the input signal transmitting unit 2b and the display device 3, for example, in a state in which the input device 2 is detached from the display device 3, wireless communication such as Bluetooth (registered trademark, hereinafter omitted), infrared communication, or a wireless Local Area Network (LAN) can be cited.

Further, in a state in which the input device 2 is combined with the display device 3, the communication method may be wired communication, but is not limited to the wired communication. In other words, the above wireless communication may be performed in the state in which the input device 2 is combined with the display device 3.

The display device 3 displays a function to be operated in a control target apparatus 4. The display device 3 includes, as its configuration, an input signal receiving unit 3a, a sensor 3b, a control mode determining unit 3c, a storage unit 3d, an operation information receiving unit 3e, a control processing unit 3f, a control information transmitting unit 3g, and a display unit 3h.

The input signal receiving unit 3a receives the input signal from the input signal transmitting unit 2b of the input device 2. A communication method between the input signal transmitting unit 2b and the input signal receiving unit 3a is the same as that of the above-described input signal transmitting unit 2b.

The sensor 3b is an embodiment of a detection unit in the present invention, and detects whether the input device 2 and the display device 3 are in a combined state or in a detached state.

For example, an exposed electrode is provided on an outer surface of each of the input device 2 and the display device 3. When the electrode of the input device 2 and the electrode of the display device 3 are electrically connected, the sensor 3b detects that the input device 2 and the display device 3 are in the combined state.

Further, the sensor 3b may be configured using a magnetic force sensor. In this configuration, when the input device 2 and the display device 3 are magnetically connected, the sensor 3b detects that they are in the combined state.

It should be noted that the operation apparatus 1 according to the first embodiment is not limited to these structures of the sensor 3b. In other words, as long as it is possible to detect whether the input device 2 and the display device 3 are in a combined state or in a detached state, a sensor 3b having a structure other than those described above may be adopted.

The control mode determining unit 3c is an embodiment of a determining unit in the present invention and determines a control mode associated with a state detected by the sensor 3b from among control modes that can be set for the control target apparatus 4.

There are two control modes that can be set for the control target apparatus 4: a full control mode; and a simple control mode. For example, in the control mode determining unit 3c, the full control mode is associated with the state in which the input device 2 and the display device 3 are combined, and the simple control mode is associated with the detached state.

Here, the full control mode embodies a first control mode in the present invention, and all functions of the control target apparatus 4 are made operable and displayed on the display unit 3h.

The simple control mode embodies a second control mode in the present invention, and among functions that can be operated in the control target apparatus 4, a preset function is made operable and displayed on the display unit 3h. In other words, in the simple control mode, one or more functions fewer than the functions in the full control mode are to be operated.

The storage unit 3d stores first reference data indicating a correspondence relationship between a control mode settable in the control target apparatus 4 and a display mode of each function corresponding to the control mode. In the first reference data, for example, a Graphical User Interface (GUI) in which each of the functions to be operated is hierarchized is associated with the full control mode.

A mode in which the preset function is displayed among the functions that can be operated in the control target apparatus 4 is associated with the simple control mode.

The operation information receiving unit 3e receives operation information from the control target apparatus 4. The operation information is information indicating an operation state of the control target apparatus 4. As the operation state, for example, when the control target apparatus 4 is an air conditioner, a current set temperature, a wind direction, an air flow rate, setting of an on or off timer of the air conditioner, and the like can be cited. As a communication method between the operation information receiving unit 3e and the control target apparatus 4, for example, radio communication, such as Bluetooth, infrared communication, or wireless LAN, can be mentioned, and in a case where the display device 3 is combined with the control target apparatus 4, wired communication may be mentioned.

The control processing unit 3f switches a control mode of the control target apparatus 4 to the control mode determined by the control mode determining unit 3c and causes the display unit 3h to display the function to be operated in a display mode corresponding to the switched control mode.

For example, when the control target apparatus 4 is switched to the full control mode, the control processing unit 3f refers to the first reference data stored in the storage unit 3d and causes the display unit 3h to display the GUI in which each of the functions to be operated is hierarchized. When the control target apparatus 4 is switched to the simple control mode, the control processing unit 3f selects only the preset function among the functions that can be operated in the control target apparatus 4 and causes the display unit 3h to display the selected function.

The control information transmitting unit 3g transmits control information to the control target apparatus 4. Note that the control information is information for causing the control target apparatus 4 to execute a requested function and is generated by the control processing unit 3f In other words, upon receiving an operation request for the function displayed on the display unit 3h, the control processing unit 3f generates control information for executing this function.

The display unit 3h displays display information input from the control processing unit 3f. As the display unit 3h, for example, a monitor of liquid crystal or organic Electronic Luminescence (EL) can be cited.

Next, operation will be described.

Figure 2:
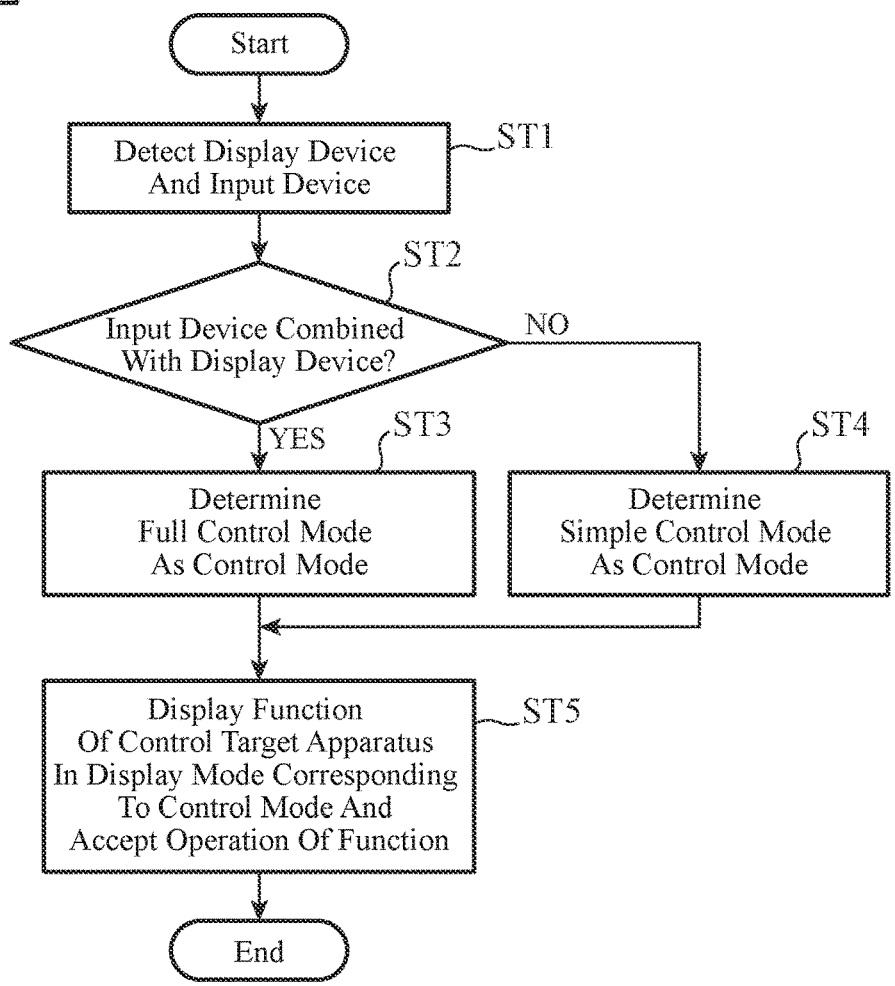
FIG. 2 is a flowchart showing operation of the operation apparatus according to the first embodiment.
Figure 3:
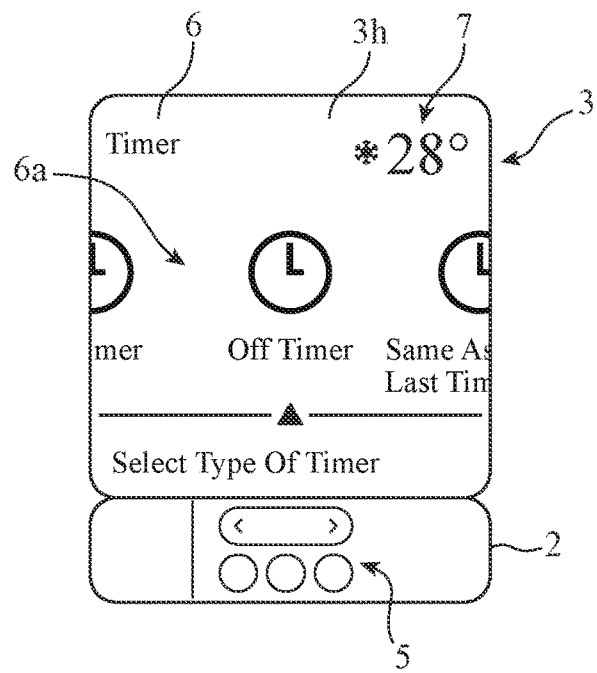
FIG. 3 is a view showing a state in which an input device is combined with a display device in the operation apparatus according to the first embodiment.
Figure 4:
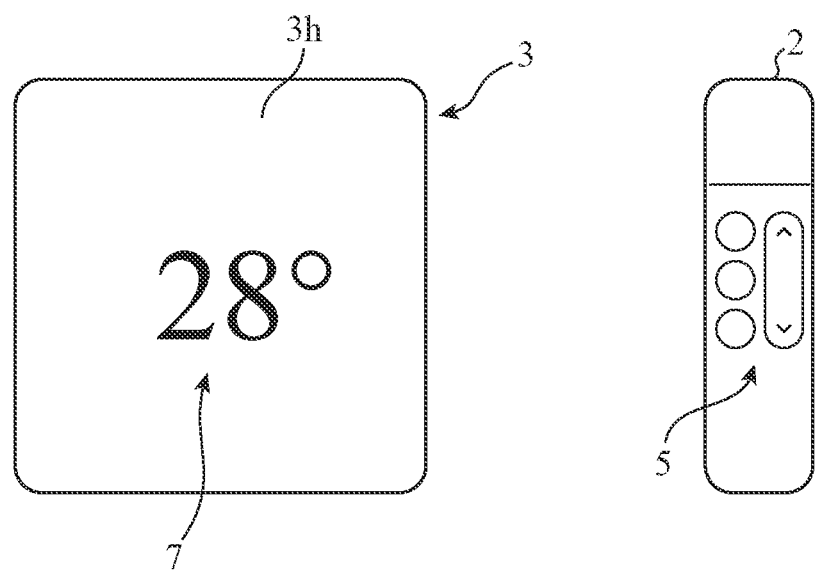
FIG. 4 is a view showing a state in which the input device is detached from the display device in the operation apparatus according to the first embodiment.

FIG. 2 is a flowchart showing operation of the operation apparatus 1, and shows a series of processing for switching the control mode and the display mode of the function depending on whether or not the input device 2 and the display device 3 are in a combined state. Further, FIG. 3 is a view showing a state in which the input device 2 is combined with the display device 3 in the operation apparatus 1. FIG. 4 is a view showing a state in which the input device 2 is detached from the display device 3 in the operation apparatus 1. Note that, in the following description, a case where the operation apparatus 1 is a remote controller of an air conditioner is taken as an example.

The sensor 3b detects whether the input device 2 and the display device 3 are in a combined state or a detached state (step ST1). This detection information is output from the sensor 3b to the control mode determining unit 3c.

If it is detected by the sensor 3b that the input device 2 is attached to the display device 3 (step ST2; YES), the control mode determining unit 3c determines that the full control mode is a control mode to be set for the control target apparatus 4 (step ST3).

On the other hand, if it is detected by the sensor 3b that the input device 2 is detached from the display device 3 (step ST2; NO), the control mode determining unit 3c determines that the simple control mode is the control mode to be set for the control target apparatus 4 (step ST4).

In step ST5, if the control mode determined by the control mode determining unit 3c is the full control mode, the control processing unit 3f generates control information for setting the full control mode to the control target apparatus 4. Then, the control processing unit 3f instructs the control information transmitting unit 3g to transmit the control information to the control target apparatus 4. The control target apparatus 4 is in the full control mode in accordance with the control information, and all the functions can be operated.

Furthermore, the control processing unit 3f refers to the first reference data stored in the storage unit 3d, thereby specifying a display mode of each of the functions corresponding to the full control mode.

For example, the control processing unit 3f sets all the functions of the control target apparatus 4 as operation targets, and causes the display unit 3h to display the GUI in which each of these functions is hierarchized.

FIG. 3 shows an example of the GUI described above. On the display unit 3h, a function name "timer" 6, a function name "select type of timer" belonging to a hierarchy of this function, and various timers 6a of selection items are displayed. With this GUI, it is possible to scroll and select a display of each of the various timers 6a using at least one of operation buttons 5 of the input device 2.

It should be noted that a set temperature display 7 is also displayed on the display unit 3h, which is "28°" in the example of FIG. 3.

Further, in step ST5, if the control mode determined by the control mode determining unit 3c is the simple control mode, the control processing unit 3f generates control information for setting the simple control mode to the control target apparatus 4. Then, the control processing unit 3f transmits the generated control information to the control target apparatus 4 by the control information transmitting unit 3g. In this way, the control target apparatus 4 is in the simple control mode, and only the preset function can be operated.

Furthermore, the control processing unit 3f refers to the first reference data stored in the storage unit 3d, thereby specifying the display mode of the function corresponding to the simple control mode.

For example, the control processing unit 3f causes the display unit 3h to display only the set temperature display 7 as shown in FIG. 4. In the set temperature display 7, it is possible to raise or lower the temperature by using at least one the operation buttons 5 of the input device 2. Further, upon receiving the operation of the set temperature display 7 using at least one of the operation buttons 5, the control processing unit 3f immediately generates control information and instructs the control information transmitting unit 3g to transmit the control information to the control target apparatus 4. In the air conditioner that is the control target apparatus 4, set temperature is changed to temperature of the set temperature display 7.

As described above, in the simple control mode, at least one of the operation buttons 5 of the input device 2 has a role of a direct key for directly calling up the preset function.

In addition, since the temperature raised or lowered using at least one of the operation buttons 5 is immediately displayed on the set temperature display 7, an operation result is immediately fed back to a user.

Note that, in the simple control mode, the function that can be called up by the input device 2 may be configured so that the user can appropriately select from among the functions that can be operated in the full control mode. For example, the control processing unit 3f causes the display unit 3h to display a GUI that allows the user to select a function of the simple control mode, and sets a function selected using the input device 2 as the function of the simple control mode. As a result, a main function of the control target apparatus 4, a function frequently used by the user, or the like is set as the function of the simple control mode.

In the simple control mode, since it is not necessary to search for a desired function from many functions, it is possible to easily operate the function displayed on the display unit 3h using the operation buttons 5.

For example, in a scheduled operation setting function of the air conditioner, it is necessary to sequentially set on time, off time, set temperature, etc. of the air conditioner. Such a function is set as an operation target in the full control mode. In addition, it is expected that an operation such as a set temperature changing operation, rapid cooling, or rapid heating is generally used frequently, so that such a function is set as an operation target in the simple control mode. Thus, it is possible to easily operate the function using the operation buttons 5.

In addition, when the control target apparatus 4 is a recording apparatus, a complicated operation for setting recording start time, recording end time, an editing content, or the like is necessary for a function such as recording reservation setting or recording content editing. Such a function is to be operated in the full control mode.

Since it is expected that use frequency of a broadcast station switching operation, a volume changing operation, or the like is generally high, such a function is set as an operation target in the simple control mode. Thus, it is possible to easily operate the function using the operation buttons 5.

As described above, in the operation apparatus 1 according to the first embodiment, the sensor 3b detects whether the input device 2 and the display device 3 are in the combined state or in the detached state. The control mode determining unit 3c determines a control mode associated with the state detected by the sensor 3*b* from among the control modes that can be set for the control target apparatus 4. The control processing unit 3*f* switches a control mode of the control target apparatus 4 to the control mode determined by the control mode determining unit 3*c* and causes the display unit 3*h* to display a function to be operated in a display mode corresponding to the switched control mode. Thereby, it is possible to switch the control mode of the control target apparatus 4 and the display mode of the function without separately providing a switching button.

Further, in the operation apparatus 1 according to the first embodiment, the control mode determining unit 3*c* determines the control mode associated with the state detected by the sensor 3*b* from the full control mode and the simple control mode.

In this manner, by a simple operation of combining or detaching the input device 2 and the display device 3, it is possible to switch a control mode of the control target apparatus 4 between the full control mode and the simple control mode.

Second Embodiment

Figure 5:
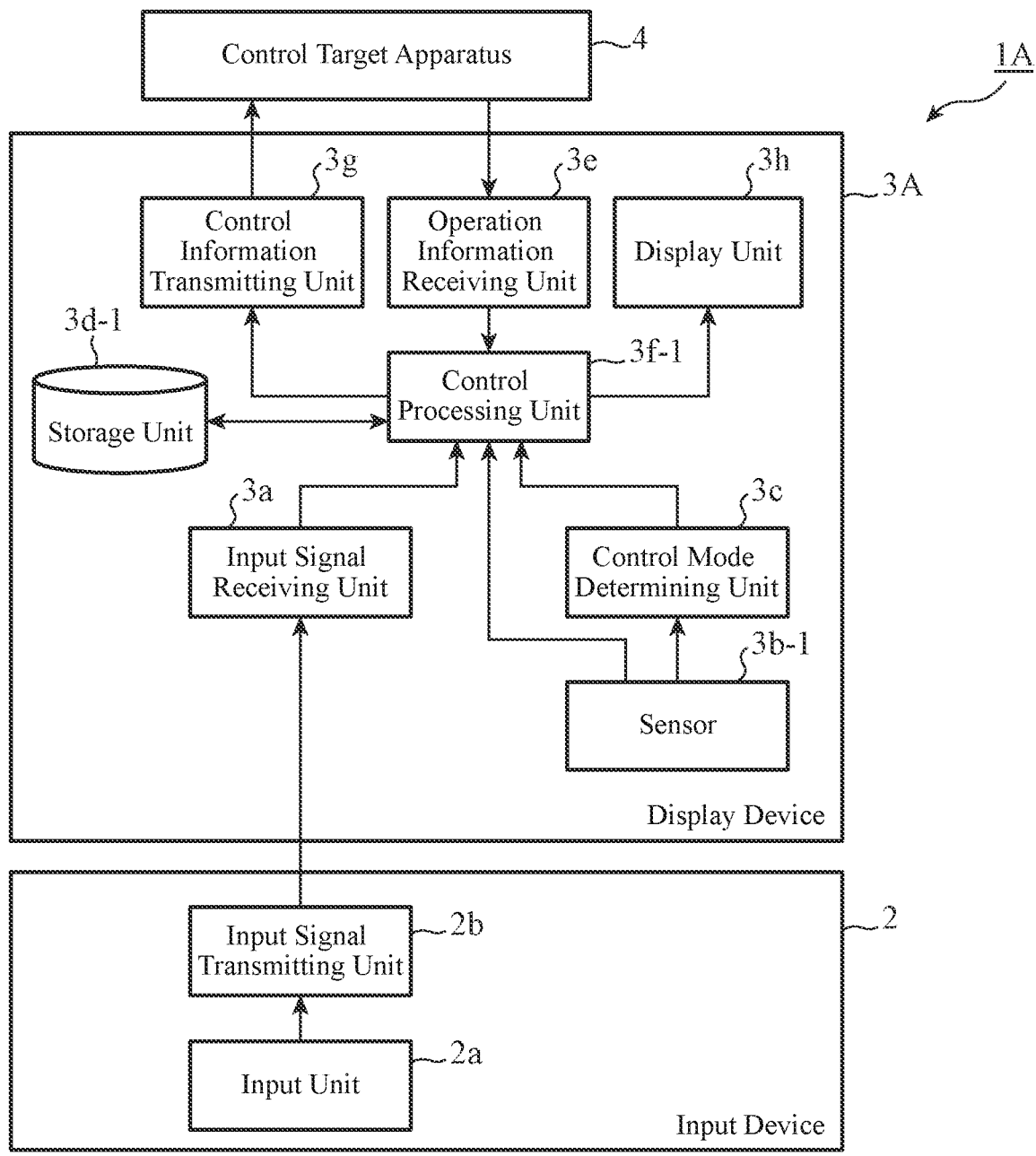
FIG. 5 is a block diagram showing a configuration of an operation apparatus according to a second embodiment of the present invention.

FIG. 5 is a block diagram showing a configuration of an operation apparatus 1A according to a second embodiment of the present invention.

Note that, in FIG. 5, the same components as those in FIG. 1 are denoted by the same reference numerals, and description thereof is omitted.

The operation apparatus 1A includes an input device 2 and a display device 3A.

The display device 3A includes an input signal receiving unit 3*a*, a sensor 3*b*-1, a control mode determining unit 3*c*, a storage unit 3*d*-1, an operation information receiving unit 3*e*, a control processing unit 3*f*-1, a control information transmitting unit 3*g*, and a display unit 3*h*.

The sensor 3*b*-1 embodies a detection unit in the present invention, and detects a positional relationship between the input device 2 and the display device 3A in a state in which the input device 2 and the display device 3A are combined. For example, when the display device 3A has a quadrangular outer shape in a planar view, exposed electrodes are provided on respective surfaces including upper, lower, left, and right sides of the quadrangle, and an exposed electrode is provided on an outer surface of the input device 2. The sensor 3*b*-1 specifies a surface having an electrode electrically connected to the electrode of the input device 2 among the electrodes on the surfaces of the display device 3A, thereby detecting that the input device 2 is attached to this surface.

Further, the sensor 3*b*-1 may be configured using a magnetic force sensor. In this case, the sensor 3*b*-1 specifies a surface magnetically connected to the input device 2 among the surfaces of the display device 3A, and detects that the input device 2 is attached to this surface.

Note that the operation apparatus 1A according to the second embodiment is not limited to these structures of the sensor 3*b*-1. In other words, as long as a positional relationship in the state in which the input device 2 and the display device 3A are combined can be detected, a sensor 3*b*-1 having a structure other than the above structures may be adopted.

In the storage unit 3*d*-1, the first reference data described in the first embodiment is stored, and second reference data indicating positional relationships between the input device 2 and the display device 3A and a correspondence relationship between a display mode of a function corresponding to each of the positional relationships and an operation method is stored.

For example, when the display device 3A has a quadrangular outer shape in a planar view, in the second reference data, a selection screen on which selection items of a function are arranged along each side of the quadrangle is set as a display mode, and a scroll operation along each side is associated as an operation method of this selection screen.

The control processing unit 3*f*-1 causes the display unit 3*h* to display a function to be operated in a control mode determined by the control mode determining unit 3*c* in a display mode associated with the positional relationship detected by the sensor 3*b*-1. Then, the control processing unit 3*f*-1 accepts an operation of the function by an operation method associated with this display mode. For example, the control processing unit 3*f*-1 refers to the second reference data stored in the storage unit 3*d*-1, thereby specifying the display mode of the function corresponding to the positional relationship detected by the sensor 3*b*-1 and the operation method.

Next, details of a GUI based on a combination positional relationship between the input device 2 and the display device 3A will be described. Here, the operation apparatus 1A is a remote controller of an air conditioner, and the display device 3A has a quadrangular outer shape in a planar view.

Figure 6:
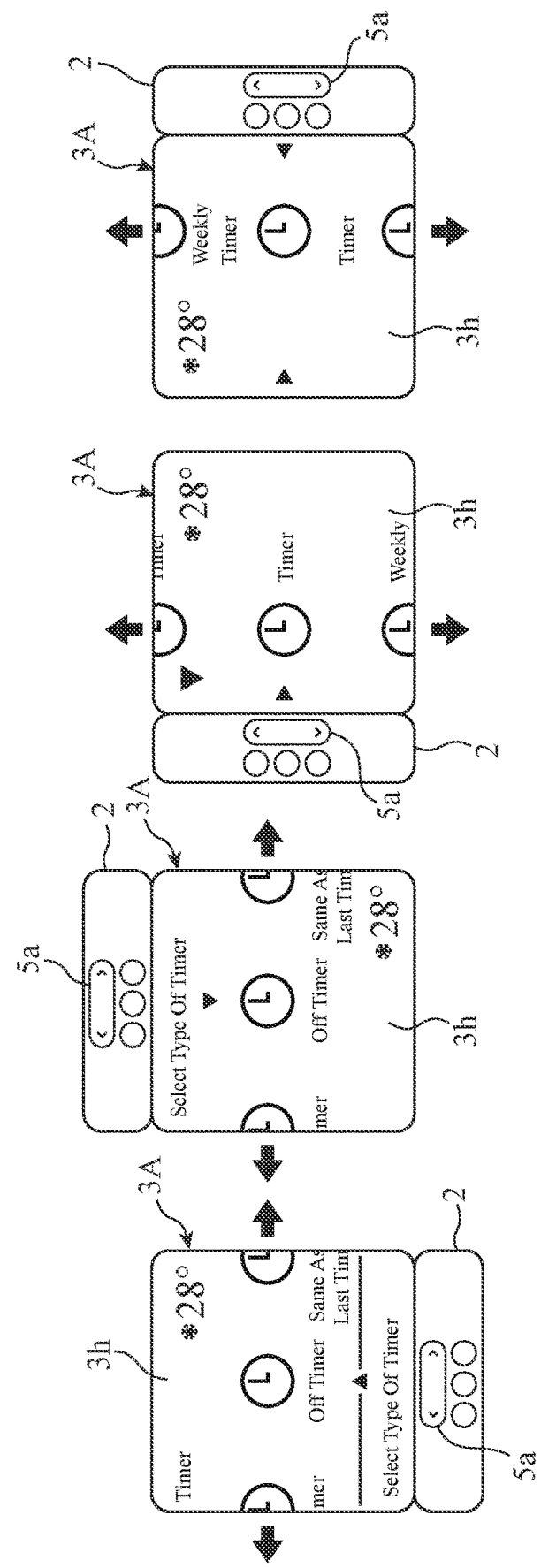
FIG. 6A is a view showing a state in which an input device is combined with a lower surface of a display device in the operation apparatus according to the second embodiment.
FIG. 6B is a view showing a state in which the input device is combined with an upper surface of the display device.
FIG. 6C is a view showing a state in which the input device is combined with a left side surface of the display device.
FIG. 6D is a view showing a state in which the input device is combined with a right side surface of the display device.

In FIG. 6A or 6B, the input device 2 is attached to a lower surface or an upper surface of the display device 3A. By specifying the display mode of the function from the second reference data stored in the storage unit 3*d*-1, the control processing unit 3*f*-1 causes the display unit 3*h* to display a selection screen on which various timers as selection items of a timer setting function are arranged along a side on the lower surface or the upper surface of the display device 3A.

Further, when an operation button 5*a* of the input device 2 is pressed down, the control processing unit 3*f*-1 moves the various timers in a direction along the side on the lower surface or the upper surface of the display device 3A.

In FIG. 6C or 6D, the input device 2 is attached to a left surface or a right surface of the display device 3A. By specifying the display mode of the function from the second reference data stored in the storage unit 3*d*-1, the control processing unit 3*f*-1 causes the display unit 3*h* to display a selection screen on which various timers as selection items of the timer setting function are arranged along a side on the left surface or the right surface of the display device 3A.

Further, when the operation button 5*a* of the input device 2 is pressed down, the control processing unit 3*f*-1 moves the various timers in a direction along the side on the left surface or the right surface of the display device 3A.

Since the GUI for operating the function is changed depending on the combination positional relationship between the input device 2 and the display device 3A, various GUIs can be provided for a user by a simple operation of simply attaching the input device 2 to the display device 3A.

Hitherto, a case where the display mode of the function to be operated in the control mode determined by the control mode determining unit 3*c* is changed depending on the combination positional relationship between the input device 2 and the display device 3A has been described, but the function itself may be changed.

For example, third reference data associating each of the combination positional relationships between the input device 2 and the display device 3A with a function operable in a control mode of a control target apparatus 4 is stored in the storage unit 3d-1 instead of the second reference data. By referring to the third reference data stored in the storage unit 3d-1, the control processing unit 3f-1 selects a function associated with the positional relationship detected by the sensor 3b-1 as an operation target and causes the display unit 3h to display the selected function.

For example, there is a case where the control target apparatus 4 is an air conditioner and has functions such as operation mode switching setting, temperature setting, timer setting, and menu setting.

When the input device 2 is attached to the upper surface of the display device 3A, the control processing unit 3f-1 selects the operation mode switching setting as an operation target and causes the display unit 3h to display the selected setting.

Further, when the input device 2 is attached to the lower surface of the display device 3A, the control processing unit 3f-1 selects the temperature setting as the operation target and causes the display unit 3h to display the selected setting.

Furthermore, when the input device 2 is attached to the left surface of the display device 3A, the control processing unit 3f-1 selects the timer setting as the operation target and causes the display unit 3h to display the selected setting, and when the input device 2 is attached to the right surface of the display device 3A, the control processing unit selects the menu setting as the operation target and causes the display unit 3h to display the selected setting.

Thus, it is possible to switch a function of the control target apparatus 4 by the simple operation of simply attaching the input device 2 to the display device 3A.

Note that, although the case where the display device 3A has the quadrangular outer shape in the planar view has been described, the outer shape of the display device 3A is not limited thereto. For example, the display device 3A may have a polygonal outer shape other than the quadrilateral outer shape in a planar view. In this case, a selection screen on which selection items of a function are arranged along each side of the display device 3A may be displayed on the display unit 3h, and the selection items may be scrolled in the direction along this side.

Further, when the input device 2 has an outer shape having a longitudinal direction, a selection screen on which selection items of a function are arranged along the longitudinal direction of the input device 2 may be displayed on the display unit 3h, and the selection items may be scrolled in the longitudinal direction of the input device 2.

As described above, in the operation apparatus 1A according to the second embodiment, the sensor 3b-1 further detects a positional relationship between the input device 2 and the display device 3A in the state in which the input device 2 and the display device 3A are combined. The control processing unit 3f-1 causes the display unit 3h to display the function to be operated in the control mode determined by the control mode determining unit 3c in a display mode associated with the positional relationship detected by the sensor 3b-1, and accepts an operation of the function in an operation method associated with this display mode. Thus, since a GUI for operating the function is changed depending on the combination positional relationship between the input device 2 and the display device 3A, various GUIs can be provided for the user by the simple operation of simply attaching the input device 2 to the display device 3A.

Further, in the operation apparatus 1A according to the second embodiment, the control processing unit 3f-1 selects, from among the functions that can be operated in the control mode determined by the control mode determining unit 3c, a function associated with a positional relationship detected by the sensor 3b-1. Then, the control processing unit 3f-1 causes the display unit 3h to display the selected function as an operation target. In this way, it is possible to switch a function of the control target apparatus 4 by the simple operation of simply attaching the input device 2 to the display device 3A.

Third Embodiment

Figure 7:
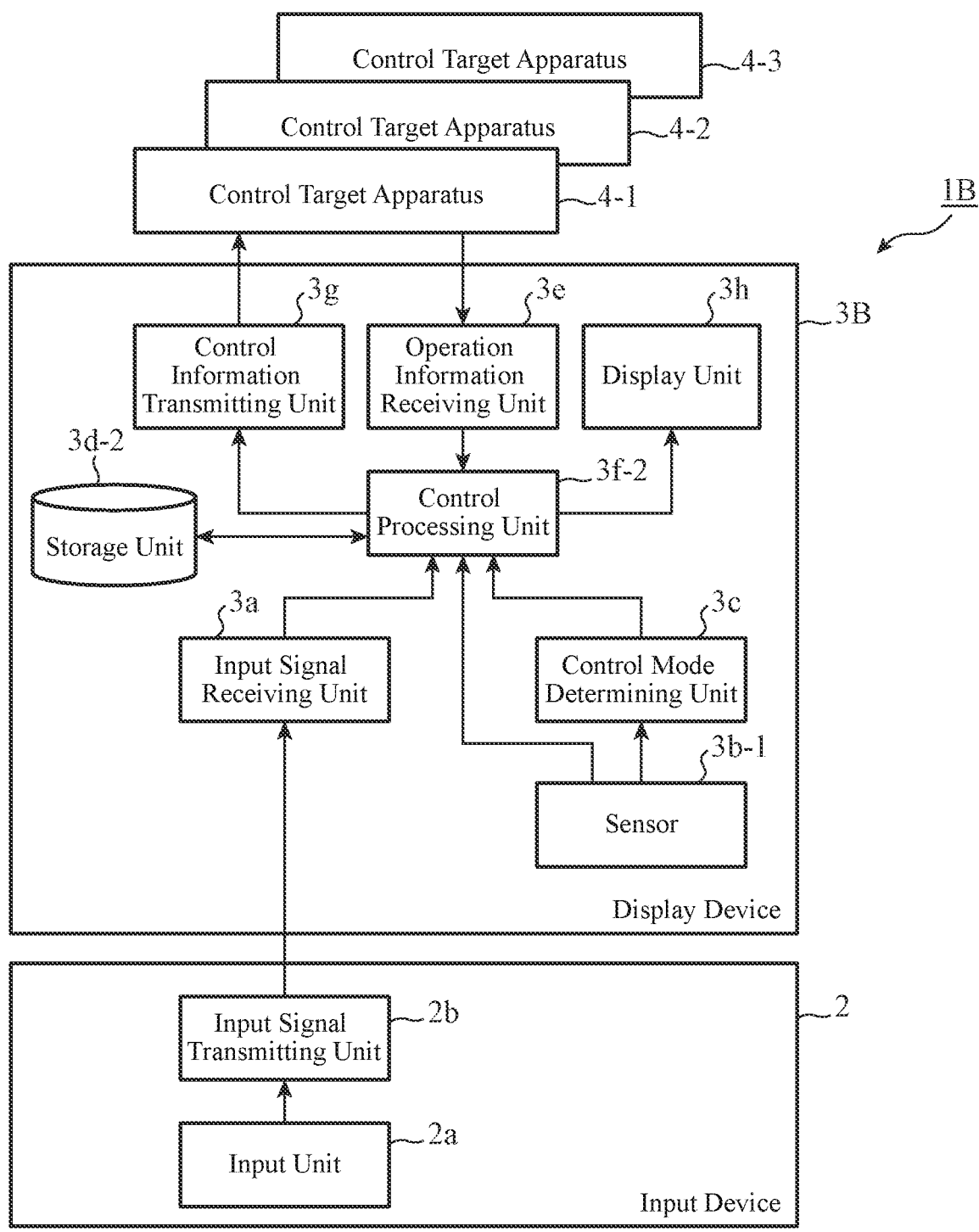
FIG. 7 is a block diagram showing a configuration of an operation apparatus according to a third embodiment of the present invention.

FIG. 7 is a block diagram showing a configuration of an operation apparatus 1B according to a third embodiment of the present invention. Note that, in FIG. 7, the same components as those in FIG. 1 and FIG. 5 are denoted by the same reference numerals, and description thereof is omitted.

The operation apparatus 1B includes an input device 2 and a display device 3B. The display device 3B includes an input signal receiving unit 3a, a sensor 3b-1, a control mode determining unit 3c, a storage unit 3d-2, an operation information receiving unit 3e, a control processing unit 3f-2, a control information transmitting unit 3g, and a display unit 3h.

In addition to the first reference data described in the second embodiment, the storage unit 3d-2 stores a fourth reference data indicating positional relationships between the input device 2 and the display device 3B and a correspondence relationship between an apparatus corresponding to each of the positional relationships and a function to be operated in the corresponding apparatus.

In a case where the display device 3B has a quadrilateral outer shape in a planar view, in the fourth reference data, an apparatus is associated with each side of the quadrangle. For example, when candidates of a control target apparatus are an air conditioner, a television, a water heater, and a Home Energy Management System (HEMS), the air conditioner is associated with a lower side of the quadrangle, the television with an upper side, the water heater with a left side, and the HEMS with a right side.

By referring to the fourth reference data stored in the storage unit 3d-2, the control processing unit 3f-2 selects, from among control target apparatuses 4-1 to 4-3, an apparatus associated with a positional relationship detected by the sensor 3b-1 as the control target apparatus.

Note that the control mode determining unit 3c determines a control mode associated with a state detected by the sensor 3b-1 from among control modes that can be set for a control target apparatus 4 selected by the control processing unit 3f-2.

The control processing unit 3f-2 switches a control mode of the control target apparatus 4 to the control mode determined by the control mode determining unit 3c, and causes the display unit 3h to display a function to be operated in a display mode corresponding to the switched control mode.

In the above example, when the input device 2 is attached to a lower side surface (a lower surface) of the display device 3B, the control processing unit 3f-2 selects the air conditioner as the control target apparatus. At this time, the control mode determining unit 3c determines a control mode associated with a state detected by the sensor 3b-1 from among control modes that can be set for the air conditioner. When the control mode is a full control mode, the control processing unit 3f-2 causes the display unit 3h to display the GUI shown in FIG. 3.

Note that, when the input device 2 is attached to an upper side surface (an upper surface) of the display device 3B, an operation of the television is possible. Further, when the input device 2 is attached to a left side surface (a left surface)

of the display device 3B, an operation of the water heater is possible, and when the input device 2 is attached to a right side surface (a right surface) of the display device 3B, an operation of the HEMS is possible.

As described above, in the operation apparatus 1B according to the third embodiment, the sensor 3*b*-1 further detects a positional relationship between the input device 2 and the display device 3B in the state in which the input device 2 and the display device 3B are combined. The control processing unit 3*f*-2 selects, as the control target apparatus, the apparatus associated with the positional relationship detected by the sensor 3*b*-1 from among the control target apparatuses 4-1 to 4-3. As a result, it is possible to switch a control target apparatus between the control target apparatuses 4-1 to 4-3 by a simple operation of simply attaching the input device 2 to the display device 3B.

In the first to third embodiments, the control target apparatus may be selected by the GUI displayed on the display unit 3*h*. In this case, the selection screen of the control target apparatus is displayed on the display unit 3*h*, and a user selects the control target apparatus using the input device 2.

For example, a selection function of the control target apparatus is included in the GUI in the full control mode described in the first embodiment, and the control target apparatus is selected by this GUI. At this time, when the air conditioner and the recording apparatus are selected as the control target apparatuses, these apparatuses can be controlled.

In the first to third embodiments, the control mode may be switched depending on an operation of the input device 2. Further, the control mode may be switched depending on operations of one or more switches provided in the display devices 3, 3A, and 3B.

In the first to third embodiments, a case where the operation apparatus includes the input device and the display device is shown, but a configuration of the operation apparatus is not limited to this. For example, an apparatus having a display function such as a television or a personal computer may be used as a display device. In this case, a sensor, a control mode determining unit, and a control processing unit are provided for an input device side. Conversely, an existing remote controller may be used as an input device.

Further, the display device in the first to third embodiments may be of a wall-hanging type or may be placed on a table. The display device may also be in the form of a mobile device such as a smartphone or a tablet device. Furthermore, the display unit 3*h* may have a touch panel on the screen.

It is to be noted that the present invention can freely combine embodiments, modify any component in the embodiments, or omit any component in the embodiments within the scope of the invention.

INDUSTRIAL APPLICABILITY

Since the operation apparatus according to the present invention can switch a control mode of a control target apparatus without separately providing a switching button, it is suitable as an operation apparatus for various apparatuses such as an air conditioner and a recording apparatus.

REFERENCE SIGNS LIST 1, 1A, 1B: operation apparatus, 2: input device, 2*a*: input unit, 2*b*: input signal transmitting unit, 3, 3A, 3B: display device, 3*a*: input signal receiving unit, 3*b*, 3*b*-1: sensor, 3*c*: control mode determining unit, 3*d*, 3*d*-1, 3*d*-2: storage unit, 3*e*: operation information receiving unit, 3*f*, 3*f*-1, 3*f*-2: control processing unit, 3*g*: control information transmitting unit, 3*h*: display unit, 4, 4-1 to 4-3: control target apparatus, 5, 5*a*: operation button, 6: function name, 6*a*: various timers, 7: set temperature display

The invention claimed is:

1. An operation apparatus comprising:
a detector to detect whether an input device and a display device are in a combined state or in a detached state;
a determiner to determine a control mode associated with a state detected by the detector from among different control modes that can be set for a control target apparatus, the state being one of the combined state and the detached state, the different control modes allowing the input device and the display device to be used to control the control target apparatus in the combined state and the detached state, respectively; and
a control processor to switch a control mode of the control target apparatus to the control mode determined by the determiner and to cause the display device to display a function to be operated in a display mode corresponding to the switched control mode, the function to be operated being a function of the control target apparatus,
wherein the detector detects a positional relationship between the input device and the display device in the combined state, and
the control processor causes the display device to display the function to be operated in the control mode determined by the determiner in a display mode associated with the positional relationship detected by the detector, and accepts an operation of the function by an operation method associated with the display mode.

2. An operation apparatus comprising:
a detector to detect whether an input device and a display device are in a combined state or in a detached state;
a determiner to determine a control mode associated with a state detected by the detector from among different control modes that can be set for a control target apparatus, the state being one of the combined state and the detached state, the different control modes allowing the input device and the display device to be used to control the control target apparatus in the combined state and the detached state, respectively; and
a control processor to switch a control mode of the control target apparatus to the control mode determined by the determiner and to cause the display device to display a function to be operated in a display mode corresponding to the switched control mode, the function to be operated being a function of the control target apparatus,
wherein the detector detects a positional relationship between the input device and the display device in the combined state, and
the control processor selects, from among functions that can be operated in the control mode determined by the determiner, a function associated with the positional relationship detected by the detector as an operation target, and causes the display device to display the selected function.

3. An operation apparatus comprising:
a detector to detect whether an input device and a display device are in a combined state or in a detached state;
a determiner to determine a control mode associated with a state detected by the detector from among different control modes that can be set for a control target apparatus, the state being one of the combined state and the detached state, the different control modes allowing the input device and the display device to be used to control the control target apparatus in the combined state and the detached state, respectively; and a control processor to switch a control mode of the control target apparatus to the control mode determined by the determiner and to cause the display device to display a function to be operated in a display mode corresponding to the switched control mode, the function to be operated being a function of the control target apparatus, wherein the detector detects a positional relationship between the input device and the display device in the combined state, and the control processor selects, from among a plurality of apparatuses, an apparatus associated with the positional relationship detected by the detector as a control target apparatus.

* * * * *